Oct. 6, 1931.   C. THURNEYSSEN   1,826,583
PROCESS OF METALLURGICAL TREATMENT
Filed Feb. 19, 1927
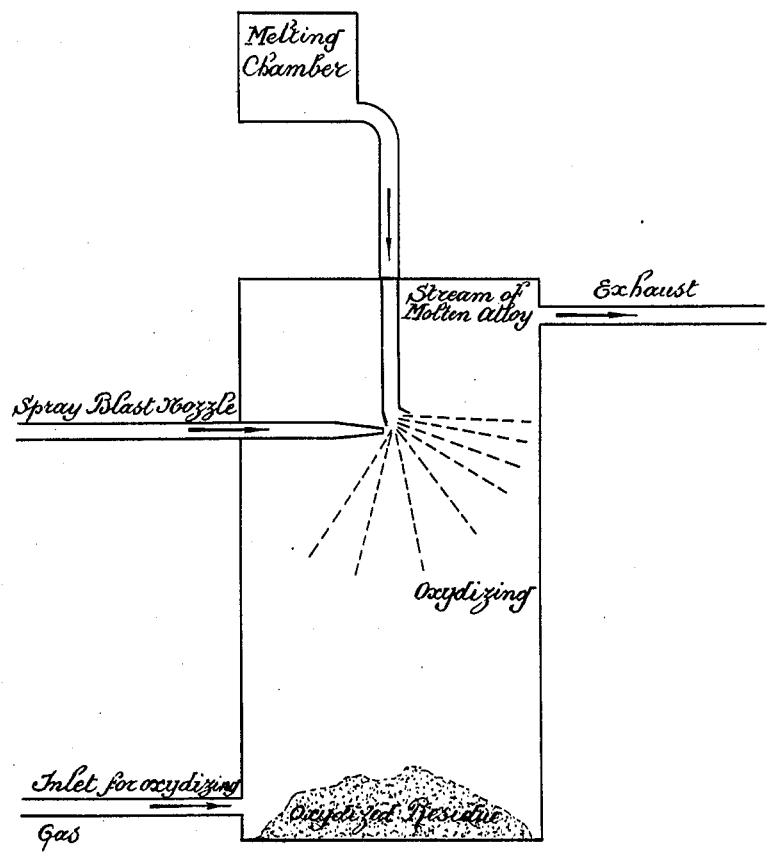
Inventor
C. Thurneyssen,
By Langner, Parry, Card & Langner
Attys.

Patented Oct. 6, 1931

1,826,583

UNITED STATES PATENT OFFICE

CHRISTIAN THURNEYSSEN, OF PARIS, FRANCE, ASSIGNOR TO SOCIETE LE NICKEL, OF PARIS, FRANCE

PROCESS OF METALLURGICAL TREATMENT

Application filed February 19, 1927, Serial No. 169,494, and in France February 23, 1926.

The present invention relates to a process for treating alloys of non-volatile metals, one of which is more oxidizible than the other, and particularly to the treatment of ferro-alloys corresponding to the above conditions for the purpose of enriching them by removing part of the iron.

The said process consists essentially in spraying the metal or alloy by a jet of gas delivered into a suitable atmosphere.

The invention further relates to an apparatus comprising in combination suitable means for projecting the metal or alloy in a stream or jet, a nozzle for delivering a strong blast of a suitable gas upon the metallic jet, and a chamber traversed by a suitable current of gas.

The said invention has chiefly for its object the removal of iron from its alloys, in which the iron is more readily oxidized than the other metals in the alloy. For such purposes I proceed in the following manner.

The drawing illustrates the process diagrammatically.

The iron alloy is poured in a thin stream in an oxidizing atmosphere, and it is sprayed by any suitable gas. The fine metallic drops are thus partially oxidized, and the resulting powdered substance is melted in a furnace together with adequate scorifying substances so as to separate the oxide of iron from the metal which is to be obtained.

The metal delivered from the melting furnace is poured in a stream having a few millimeters diameter, into a chamber or pit with metallic walls, having several meters length and several square meters cross section, in which is circulated a strong blast of oxidizing gas or air. After a few centimeters of free fall, the metallic jet is broken up by a powerful jet of compressed gas which sprays the metal into fine drops, and these drops will take fire spontaneously in contact with the oxidizing gas or air.

The combustion is completed within a very short time, and all the iron is oxidized. When cold, the metal is mixed with a silicious substance such as sand or even a silicious mineral substance. The whole is melted in a furnace, and the oxide of iron will thus produce silicates and will form a slag; this is separated from the metal sought for, and the metal is cast into ingots.

My said process can be substituted to advantage for the known converter process which is in many cases difficult of application by reason of the high temperature required for the melting of the iron alloys, or due to the insufficient heat from the combustion of the iron, or to the rapid wear of the converter lining.

It should be noted that in its various applications the said process may comprise, among others, the following modifications:

1. The compressed gas which is employed for spraying purposes may be carbon dioxide, nitrogen, or like gases under pressure.

2. The walls of the pulverizing chamber, instead of being metallic, may be, for example, cement mortar or reinforced cement (concrete).

3. In the case of treating ferro-alloys the metallic powder obtained after pulverization is collected, then treated in a second operation to carry it to the desired degree of oxidation. If oxidation has been insufficient in the pulverization step the powder is roasted. If, on the contrary, oxidation is "exaggerated" the powder collected is melted in the chambers after pulverization and metal not yet pulverized is added.

4. In the same treatment, the oxide of iron may be scorified without the use of a scorifying substance, such as sand or mineral substance, by melting the material in an electric furnace, for example, and herein the slag will consist of nearly pure oxide of iron.

5. The current of gas employed for the required oxidizing or like atmosphere may be delivered by one or more blowers or a ventilating chimney, or it may be withdrawn by the suction which may be created by the spraying nozzle itself.

6. The thickness of the stream of liquid metal which can be properly oxidized by the spraying process depends chiefly upon the amount and the pressure of the gas employed for the spraying, and also upon the size of the spraying chamber and the composition of the atmosphere therein.

*Example A.*—A ferro-nickel containing 60% of nickel and 40% of iron is obtained by melting garnierite electrically. This ferro-nickel is pulverized and remelted according to the process claimed, and we thus obtain a metal containing no more than 5 to 6% of iron. Although the process permits of further considerably reducing this iron content, we do not, however, exceed this limit in practice to reduce the loss of nickel in the slag. The deferrized ferro-nickel (that is, the nickel from which the iron has been removed) is then refined by electrolysis.

Having now particularly described and ascertained the nature of my invention and in what manner the same is to be performed, I declare that what I claim is:

1. Process for separating out the iron of ferro-nickel, ferro-cobalt and the like, consisting in melting the alloy to be purified, carrying it to a temperature of about 1500°, appreciably above the fusion temperature of said alloy, pouring said liquid alloy in the form of a liquid thread, atomizing said liquid in an oxidizing atmosphere through a jet of gas under pressure into liquid droplets so as to oxidize the iron of these droplets during their passage through the air, collecting said solidified and oxidized droplets, remelting said droplets, carrying the degree of oxidation of the bath to the desired extent and separating the non-oxidized parts from the oxidized parts.

2. Process for separating out the iron of ferro-nickel, ferro-cobalt and the like, consisting in melting the alloy to be purified, carrying it to a temperature of about 1500°, appreciably above the fusion temperature of said alloy, pouring said liquid alloy in the form of a liquid thread, atomizing said liquid in an oxidizing atmosphere through a jet of gas under pressure into liquid droplets so as to oxidize the iron of these droplets during their passage through the air, collecting said solidified and oxidized droplets, remelting said droplets with the alloy to be purified and carrying the oxidation to the desired extent and separating the oxidized from the non-oxidized parts.

In testimony whereof, I have signed my name to this specification at Paris this 2nd day of February, 1927.

CHRISTIAN THURNEYSSEN.